(12) United States Patent
Sedlock et al.

(10) Patent No.: US 6,581,252 B1
(45) Date of Patent: Jun. 24, 2003

(54) TWO-WAY SNAP-ATTACH CLIP

(75) Inventors: Joseph M. Sedlock, Rockford, MI (US); Robert L. Allen, Hudsonville, MI (US); Kenneth Bailey, Sr., Alto, MI (US); David Means, Plymouth, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 10/007,444

(22) Filed: Dec. 5, 2001

(51) Int. Cl.$^7$ ............................................... A44B 17/00
(52) U.S. Cl. ........................ 24/297; 24/453; 411/510; 411/508
(58) Field of Search ........................ 24/289, 297, 453, 24/457–459, 462, 546, 628; 403/298, 292, 326; 411/508, 509, 510, 913

(56) References Cited

U.S. PATENT DOCUMENTS

| | | |
|---|---|---|
| 2,118,800 A | 5/1938 | Smith |
| 3,251,103 A | 5/1966 | Saut |
| 3,651,545 A | 3/1972 | Hara |
| 3,764,729 A | 10/1973 | Kowalewski |
| 4,363,160 A | 12/1982 | Wibrow |
| 4,373,826 A | 2/1983 | Inamoto et al. |
| 4,393,561 A | 7/1983 | Yuda |
| 4,422,222 A | 12/1983 | Notoya |
| 4,470,178 A * | 9/1984 | Matsui .................... 24/289 |
| 4,495,380 A | 1/1985 | Ryan et al. |
| 4,524,494 A | 6/1985 | Sato et al. |
| 4,629,356 A | 12/1986 | Hayashi |
| 4,635,326 A * | 1/1987 | Yagi ........................ 24/453 |
| 4,644,614 A * | 2/1987 | Mizusawa ................ 24/453 |
| 4,681,288 A | 7/1987 | Nakamura |
| 4,701,984 A | 10/1987 | Wyckoff |
| D292,872 S | 11/1987 | Takahashi |
| 4,821,481 A | 4/1989 | Woodman |
| 4,922,587 A | 5/1990 | Pettit |
| 5,039,040 A | 8/1991 | Idjakiren |
| 5,046,223 A | 9/1991 | Kraus |
| 5,694,666 A | 12/1997 | Hamamoto |
| D392,544 S | 3/1998 | Nakamura |
| 5,758,987 A | 6/1998 | Frame et al. |
| 5,797,714 A | 8/1998 | Oddenino |
| 6,042,296 A | 3/2000 | Wittig et al. |
| 6,135,425 A | 10/2000 | Platt |
| 6,167,645 B1 * | 1/2001 | Gasko et al. ............... 40/200 |
| 6,209,178 B1 | 4/2001 | Wiese et al. |
| 6,305,055 B1 | 10/2001 | Castro |

* cited by examiner

*Primary Examiner*—J. J. Swann
*Assistant Examiner*—André L. Jackson
(74) *Attorney, Agent, or Firm*—Price, Heneveld, Cooper, DeWitt & Litton

(57) ABSTRACT

A plastic grille is attached to vehicle fenders by fasteners having a first connector section particularly shaped to snappingly engage a hole in the grille, and having an oppositely-facing second connector section particularly shaped to snappingly engage a hole in the fenders. The first and second connector sections are shaped for optimal low insertion force, yet high retention force. The first and second connectors have flexible arms that are oriented 90 degrees apart, permitting the connectors to slip in perpendicular directions in their respective receiving holes, thus providing improved tolerance and adjustability during installation. A method of assembly includes pre-attaching the fastener to the plastic component, and then attaching them as a unit to the metal component.

11 Claims, 3 Drawing Sheets

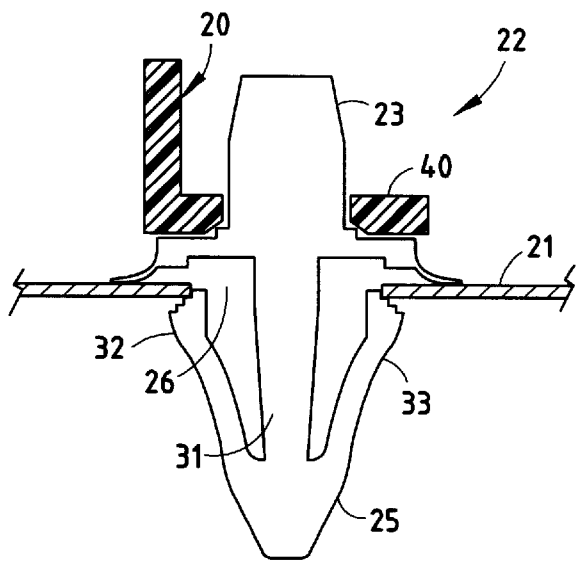 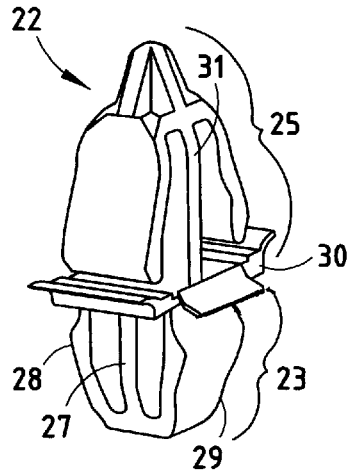
FIG. 3    FIG. 4
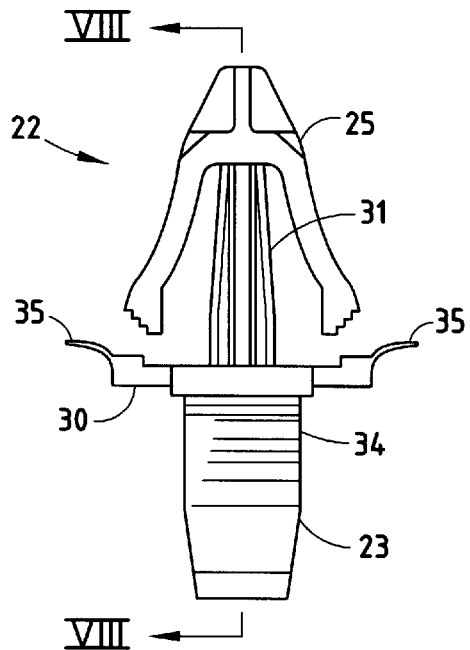 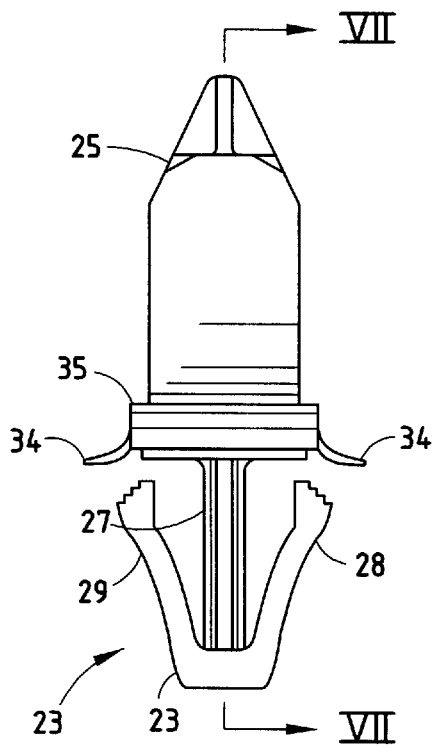
FIG. 5    FIG. 6

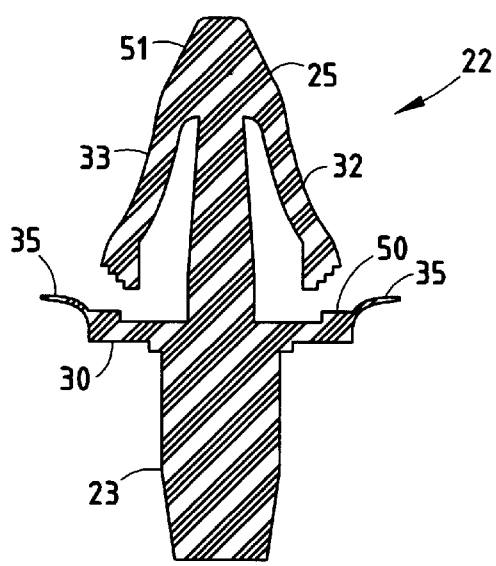
FIG. 7
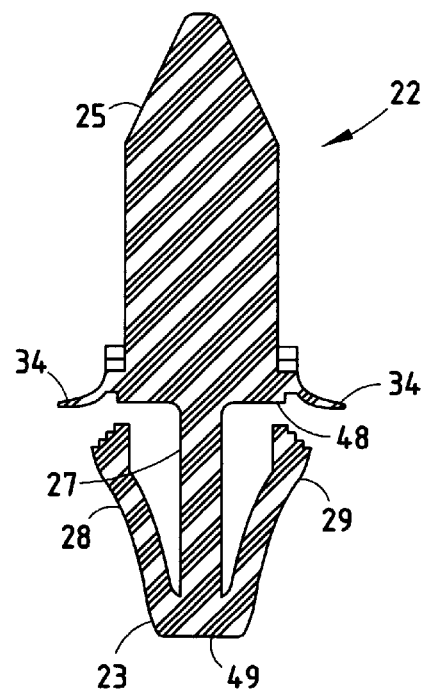
FIG. 8
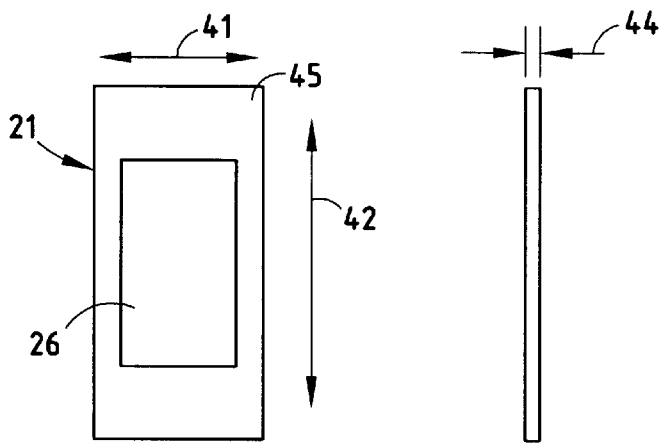
FIG. 9
FIG. 10
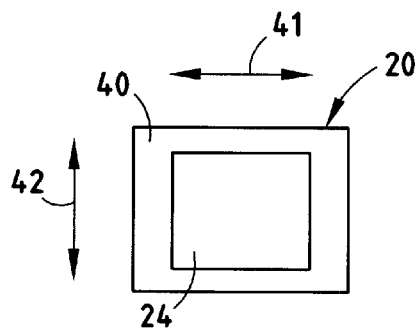
FIG. 11
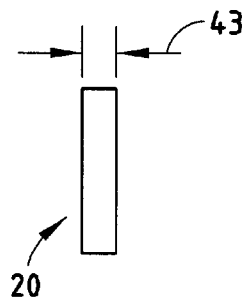
FIG. 12

TWO-WAY SNAP-ATTACH CLIP

BACKGROUND OF THE INVENTION

The present invention relates to fastening systems for snap-attaching a first component to a second component, and more particularly relates to a fastener adapted to easily and securely snap-attach to a first component, such as a plastic component, and then adapted to easily and securely snap-attach to a second component, such as a sheet metal component.

Quick and secure assembly is very important to automotive assembly plants, since manual labor is expensive and repair is even more expensive. Every additional loose fastener and/or screw adds considerably to manual labor and assembly time. It is desirable to provide a secure attachment system that quickly and securely attaches, but also that is low-cost, mechanically simple and very reliable, yet that does permit later repair without the need for additional fasteners or parts. Preferably, the attachment system can be optimized for any type of component that is being attached, whether the component is plastic, sheet metal, composite material, or other material. Further, it is preferable that the attachment system engages structures that are easily formed in the respective component parts. Also, an attachment system is desired that allows for variation in hole locations due to manufacturing tolerances, yet that is not loose and sloppy after the connection even with thickness variations in components.

Accordingly, an improved fastening system is desired having the aforementioned advantages and solving the aforementioned problems.

SUMMARY OF THE PRESENT INVENTION

In one aspect of the present invention, a fastener system adapted to secure first and second components together in abutting relation includes a fastener having a transverse center flange and oppositely facing first and second connector sections extending from the center flange. Each of the first and second connector sections include a stem and a pair of resilient arms extending from the stem at a reverse angle toward the center flange. The arms each are adapted to flex inwardly as the arms are extended through marginal material forming a hole and are adapted to flex outwardly when free ends of the arms clear the marginal material. The ends of the arms are shaped to frictionally engage a blind side of the marginal material to retain the fastener in the hole. By this arrangement, the first connector section is adapted fit into a first hole in the first component and securely engage the first component, and the second connector section is adapted to fit into a second hole in the second component and to securely engage the second component independent of the first component. Accordingly, the fastener can be pre-attached to the first component and then the first component and the fastener as a unit can be attached to the second component by orienting and engaging the fastener with the second component.

In another aspect of the present invention, a method includes steps of providing a plastic component having a first flange defining a first hole, providing a metal component having a second flange made of sheet metal and that defines a second hole, and providing a fastener with a first snap-connector section and an oppositely-facing second snap-connector section. The method includes extending the first snap-connector section through the first hole and into frictional engagement with the first flange, and assembling the plastic component to the metal component including manipulating the plastic component to extend the second snap-connector section into frictional engagement with the second hole.

In another aspect of the present invention, a fastener system includes a fastener having a flat flange adapted to abuttingly engage a face surface on a first component, a stem extending perpendicularly from a center of the flat flange, flexible arms extending at a reverse angle from an outer end of the stem toward the flat flange, and resilient fins extending at an angle from edges of the flat flange at locations where the fins are adapted to resiliently engage the face surface. The arms are each adapted to flex inwardly as the arms are extended through marginal material forming a hole in the face surface and are adapted to flex outwardly when free ends of the arms clear the marginal material. The free ends of the arms are shaped to frictionally engage a blind side of the marginal material to retain the fastener in the hole, with the resilient fins providing an opposing force against the face surface and in turn against the arms to prevent looseness. By this arrangement, the connector section is adapted fit into a hole in the first component and securely engage the first component, with the fins taking up any looseness by engaging the first component in opposition to the arms, and with the flat flange abuttingly engaging the first component to add stability.

These and other features, objects, and advantages of the present invention will become apparent to a person of ordinary skill upon reading the following description and claims together with reference to the accompanying drawings.

BRIEF DESCRIPTION OF DRAWINGS

FIGS. 2–3 are side cross sections taken longitudinally in orthogonal directions through a fastener of FIG. 1 showing assembly of the fastener to a grille and to a sheet metal fender;

FIGS. 4–6 are perspective, front and side views of the fastener of FIG. 3;

FIGS. 7–8 are cross sections taken along the lines VII—VII and VIII—VIII in FIGS. 5–6;

FIGS. 9–10 are plan and side views of the hole in the sheet metal fender of FIG. 3: and FIGS. 11–12 are plan and side views of the hole in the plastic grille of FIG. 3.

DETAILED DESCRIPTION OF THE PREFERRED EMBODIMENT

Figure 1:
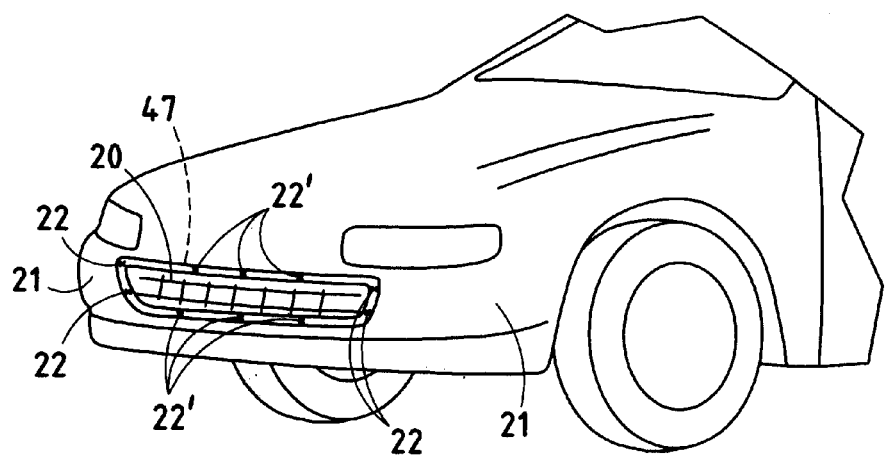
FIG. 1 is a perspective view of a vehicle including a grille attached to fenders using the present fastener system.

A fastening system is provided for attaching a plastic grille 20 to vehicle fenders 21. The fastening system includes fasteners 22 having a first connector section 23 particularly shaped to snappingly engage a square hole 24 in the grille 20, and having an oppositely-facing second connector section 25 particularly shaped to snappingly engage a rectangular hole 26 in the fenders 21. The first and second connector sections 23 and 25 are shaped for optimal low insertion force, yet high retention force. The connector sections 23 and 25 also are adapted to slidably adjust in their respective receiving holes 24 and 26, so that the fastening system is adapted to overcome manufacturing tolerance variations in hole locations. By this arrangement, a single fastener 22 is easily assembled to and optimally engages an apertured flange on a plastic component, such as a grille 20, and is easily assembled to and optimally engages an apertured flange on a sheet metal component, such as a fender 21, yet retains the assembly with good strength. Additional fasteners, such as screws 22' (FIG. 1), can be used to supplement attachment of the grille to the vehicle, if desired.

The first connector 23 has a longitudinally-extending stem 27 and a pair of flexible arms 28 and 29 that extend from an outer end of the stem 27 rearward toward a transverse center flange 30 located between the connector sections 23 and 25. The second connector 25 has a longitudinally-extending stem 31 and a pair of flexible arms 32 and 33 that extend from an outer end of the stem 31 rearward toward the transverse center flange 30. The arms 28/29 and arms 32/33 are oriented 90 degrees apart, permitting the connectors 23 and 25 to slip in perpendicular directions in their respective receiving holes 24 and 26, thus providing improved tolerance and adjustability during installation. Also, first resilient fins 34 extend from opposing edges of the center flange 30 for opposing the arms 28 and 29 to prevent looseness in a longitudinal direction in the connector section 23, and second resilient fins 35 extend from the other opposing edges of the center flange 30 for opposing the arms 32/33 to prevent looseness in the connector section 25.

Figure 2:
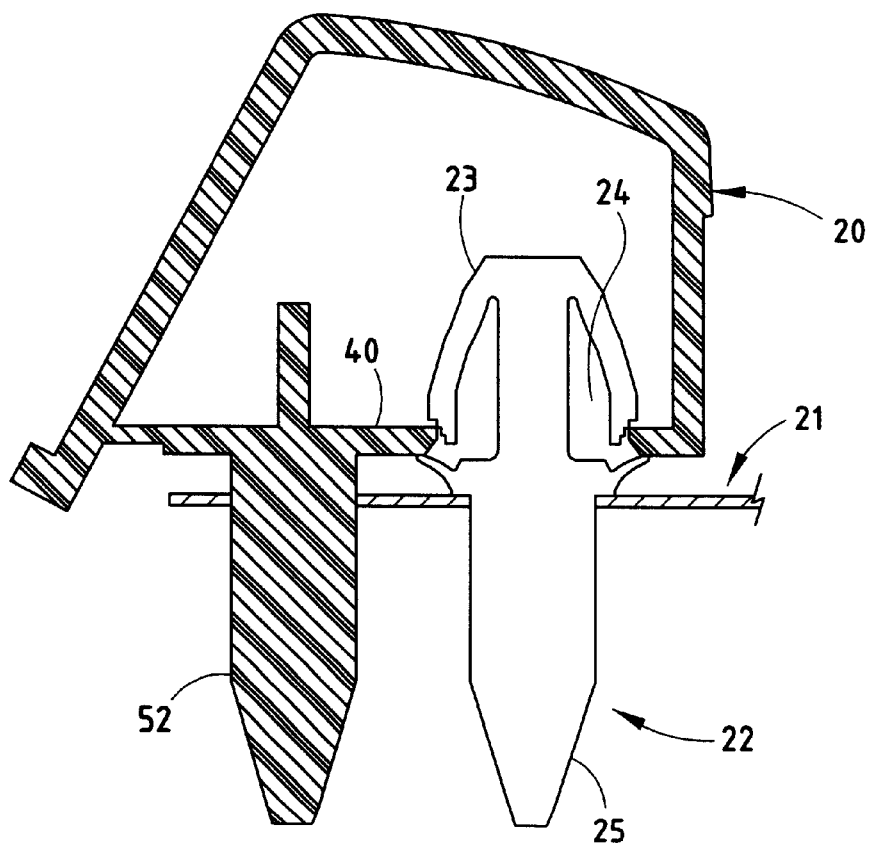

The grille 20 is a plastic component molded of a material such as ABS, and chrome-plated and painted, as desired, for aesthetics. The grille 20 includes a plastic flange 40 (FIG. 2) having marginal material defining the square hole 24 (FIGS. 11–12). The hole 24 is optimally sized for engagement with the free ends of the arms 28 and 29 of connector 24 in a first direction 41, and sized slightly larger than a width of the arms 28 and 29 in an orthogonal second direction 42 to allow for some linear sliding adjustment of the fastener 22 in the hole 24 in the second direction 42. It is noted that a thickness 43 of the plastic flange 40 may vary due to manufacturing related items, such as due to material flow and process variations, variations between different molding cavities, and the like. The sheet metal fender 21 includes a sheet metal flange 45 (FIG. 2) having marginal material defining the rectangular hole 26 (FIGS. 9–10). The thickness 44 of flange 45 may vary. The hole 26 is optimally sized for engagement with the free ends of the arms 32 and 33 in the second direction 42, and sized slightly larger than a width of the arms 32 and 33 in the orthogonal first direction 41 for some linear sliding adjustment of the fastener 22 in the hole 26 in the first direction 42. Notably, it is contemplated to be within a scope of the present invention to use a non-metal fender, such as a reaction injection molded (RIM) fender made of glass filled urethane.

It is noted that the illustrated grille 20 is securely attached by two fasteners 22 on each side to the fender 21, and is further attached by multiple top and bottom screws 22' that are threaded into a front end support 47 (FIG. 1) located immediately behind the grille 20. The front end support 47 can be a molded SMC fiberglass-reinforced plastic part or can be a welded metal assembly with brackets, or can be other constructions. Persons skilled in the art will recognize that more (or less) snap fasteners 22 can be used, that the snap fasteners 22 can be used in other locations (other than just on the fenders), that the snap fasteners 22 can be used as the only attachment mechanism if desired, that snap fasteners 22 can be used as a temporary holding mechanism until screws are inserted, and/or that other attachment systems can be used with the present snap fasteners 22 (e.g. hooks, adhesive, rivets, and friction clips).

As noted above, the first connector section 23 includes a stem 27, and arms 28 and 29 that extend from an outer end of the stem 27 at a reverse angle back toward the flat center flange 30 (FIG. 8). The stem 27 includes longitudinal ribs that reduce its cross section to facilitate molding and to stiffen the stem 27. The center flange 30 is rectangularly-shaped and has a constant thickness, and includes an abutment surface 48 (FIG. 8) that extends to a location generally under the free ends of the arms 28 and 29. The fins 34 extend along a length of an edge of the abutment surface 48 and are curvilinearly-shaped in cross section. When the first connector 23 is snapped onto the plastic flange 40, the fins flexingly engage the face of the flange 40, the abutment surface 48 abuts the face, and the arms 28 and 29 snappingly engage a blind side of the marginal material forming the face. The outer ends of the arms 28 and 29 include steps to create a more positive engagement with the marginal material on the plastic flange 40. The arms 28 and 29 are also curvilinear in shape to provide some flexibility along their length. An outer tip 49 of the stem 27 is flat, since the fastener 22 is installed in the grille 20 first at a time when it is relatively easy to position and insert the fastener 22. However, the tip 49 can be pointed or otherwise shaped to facilitate assembly, as was done to the second connector section 25 described below.

As also noted above, the second connector section 25 includes a stem 31, and arms 32 and 33 that extend from an outer end of the stem 31 at a reverse angle back toward the flat center flange 30 (FIG. 8). The stem 31 includes longitudinal ribs that reduce its cross section to facilitate molding and to stiffen the stem 31. The center flange 30 includes an abutment surface 50 (FIG. 7) that extends to a location generally under the free ends of the arms 32 and 33. The fins 35 extend along a length of an edge of the abutment surface 50 and are curvilinearly-shaped in cross section. When the second connector 25 is snapped into the hole 26 in the sheet metal flange 45, the fins 35 flexingly engage the face of the flange 45, the abutment surface 50 abuts the face, and the arms 32 and 33 snappingly engage a blind side of the marginal material forming the face. The outer ends of the arms 32 and 33 include steps to create a more positive engagement with the marginal material on the sheet metal flange 45. The arms 32 and 33 are also curvilinear in shape to provide some flexibility along their length. An outer tip 51 of the stem 31 is pointed, since the fastener 22 is installed with the grille 20 into the fender 21 at a time when it is relatively difficult to position and insert the fastener(s) 22 into the holes 26 in the fender 21. Also, a locator pin 52 (FIG. 2) is formed in the grille 20 to assist in locating the grille 20 in the fender 21 (and/or to assist in locating the grille 20 on the front-end support 47).

Notably, the connector section 23 adapted for connection to the plastic flange 40 is shorter and "stubbier" than the connector section 25 adapted for connection to the sheet metal flange 45. The shape is optimized for adequately low insertion force upon installation and optimized for high retention strength after insertion. The fins 34 and 35 are also designed to provide a desired level of take-up force to eliminate looseness in the assembly. In particular, the fins 34 are designed to take up at least about 0.5 mm of thickness variation in the plastic flange 40, and the fins 35 are designed to take up at least about 0.2 mm of thickness variation in the sheet metal flange 45.

The arms 28 and 29 of connector section 23 and the arms 31 and 32 of connector section 24 are oriented circumferentially 90 degrees apart. This along with the slightly oversized holes 24 and 26 permit some slippage of the fastener 22 in both X and Y orthogonal directions 41 and 42 for improved tolerance and adjustability during installation.

A method of assembly includes pre-attaching the fastener to the plastic component (i.e. the grille 20), and then attaching the unit to the metal component (i.e. the fender 21). Further, screws are added for additional secureness of the attachment.

In the foregoing description, it will be readily appreciated by persons skilled in the art that modifications may be made to the invention without departing from the concepts disclosed herein. Such modifications are to be considered as included in the following claims, unless these claims by their language expressly state otherwise.

The invention claimed is:

1. A fastener system adapted to secure first and second components together in abutting relation, the fastener system comprising:

a fastener including a transverse center flange and oppositely facing first and second connector sections extending from the center flange, each of the first and second connector sections including a stem and a pair of resilient arms extending from the stem at a reverse angle toward the center flange, the arms each being adapted to flex inwardly as the arms are extended through marginal material forming a hole and being adapted to flex outwardly when free ends of the arms clear the marginal material, the ends of the arms being shaped to frictionally engage a blind side of the marginal material to retain the fastener in the hole, whereby the first connector section is adapted to fit into a first hole in the first component and securely engage the first component, and the second connector section is adapted to fit into a second hole in the second component and to securely engage the second component independent of the first component, whereby the fastener can be pre-attached to the first component and then the first component and the fastener as a unit can be attached to the second component by orienting and engaging the fastener with the second component; the first and second connector sections defining a longitudinally-extending center line, and the arms of the first and second connector sections being oriented circumferentially at about 90 degrees to each other.

2. The fastener system defined in claim 1, wherein the center flange and the free ends of the first arms define a first dimension for engaging a first thickness flange, and wherein the center flange and the free ends of the second arms define a second dimension for engaging a second thickness flange, and wherein the first dimension is at least twice the second dimension.

3. The fastener system defined in claim 1, including first resilient fins extending from the center flange toward the arms of the first connector section, and including second resilient fins extending from the center flange toward the arms of the second connector section.

4. The fastener system defined in claim 1, wherein the first connector section is adapted to engage a plastic flange, and the second connector section is adapted to engage a sheet metal flange.

5. The fastener system defined in claim 1, wherein the second connector section includes a pointed tip on an outer end of the stem of the second connector section, the tip being adapted to guide the second connector into frictional engagement during assembly.

6. The fastener system defined in claim 1, including a plastic component having a hole, with the first connector section of the fastener being engaged with the hole, and wherein the plastic component includes a locator pin adjacent the hole and spaced from the fastener.

7. A fastener system comprising:

a fastener including a flat flange adapted to abuttingly engage a face surface on a first component, a first stem extending perpendicularly from a center of the flat flange, flexible arms extending at a reverse angle from an outer end of the first stem toward the flat flange, and resilient fins extending at an angle from edges of the flat flange at locations where the fins are adapted to resiliently engage the face surface, the arms each being adapted to flex inwardly as the arms are extended through marginal material forming a hole in the face surface and being adapted to flex outwardly when free ends of the arms clear the marginal material, the free ends of the arms being shaped to frictionally engage a blind side of the marginal material to retain the fastener in the hole, with the resilient fins providing an opposing force against the face surface and in turn against the arms to prevent looseness, whereby the first stem and arms are adapted to fit into a hole in the first component and securely engage the first component, with the fins taking up any looseness by engaging the first component in opposition to the arms, and with the flat flange abuttingly engaging the first component to add stability, the fastener including a second stem extending in a direction opposite the first stem, and including second arms extending at a reverse angle from an end of the second stem, the first and second stems defining a longitudinal center line and the first and second arms being oriented circumferentially at about 90 degrees to each other.

8. The fastener system defined in claim 7, including a plastic component having a first hole, with the fastener being engaged with the hole, and wherein the plastic component includes a locator pin adjacent the first hole and spaced from the fastener that is adapted to engage a locating hole on the first component.

9. A method of assembly comprising steps of:

providing a plastic component having a first flange defining a first hole;

providing a metal component having a second flange made of sheet metal and that defines a second hole;

providing a fastener with a first snap connector section and an oppositely-facing second snap connector section, the first snap connector section including a first stem and first arms extending from an end of the first stem in a reverse direction toward the first flange, and the second snap connector section including a second stem and second arms extending from an end of the second stem in a reverse direction toward the first flange; the first and second stems defining a longitudinal direction and the first arms being oriented circumferentially at about 90 degrees to the second arms;

extending the first snap connector section through the first hole and into frictional engagement with the first flange; and assembling the plastic component to the metal component including manipulating the plastic component to extend the second snap connector section into frictional engagement with the second hole.

10. The method defined in claim 9, wherein the plastic component comprises a vehicle grille.

11. The method defined in claim 10, wherein the metal component comprises a fender.

* * * * *